United States Patent Office 2,786,260
Patented Mar. 26, 1957

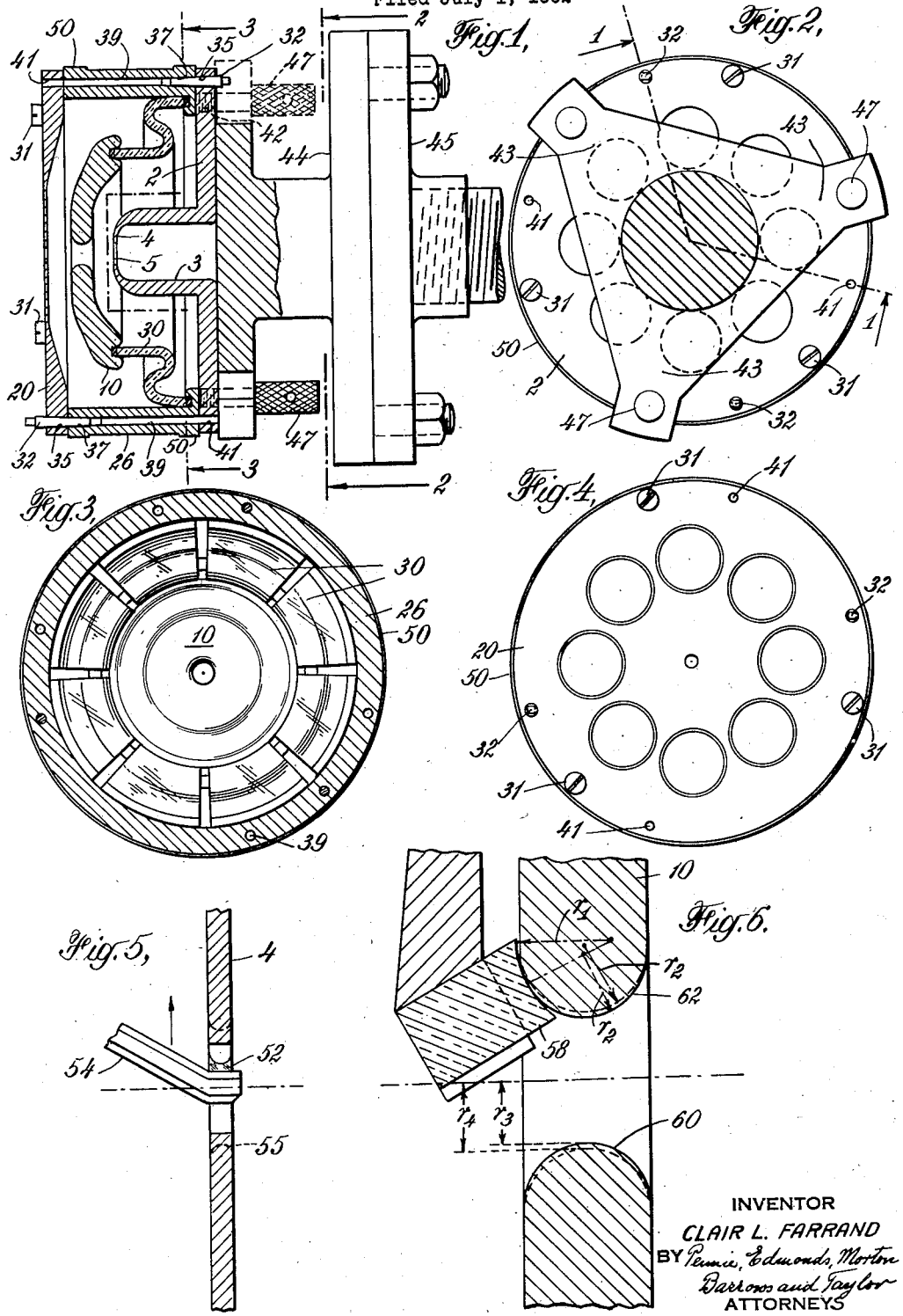
INVENTOR
CLAIR L. FARRAND

2,786,260

ELECTRON LENS

Clair L. Farrand, Bronxville, N. Y., assignor to Farrand Optical Co., Inc., New York, N. Y., a corporation of New York Application July 1, 1952, Serial No. 296,674

3 Claims. (Cl. 29—25.16)

This invention relates to electron lenses and to a method of manufacture thereof, and more particularly to electron lenses of the electrostatic type in which a plurality of apertured diaphragm electrodes are supported in coaxial relation, usually with one or more thereof electrically insulated from the others. Such lenses are useful in electron microscopes and similar apparatus.

In a known form of lens of this type three electrodes are employed, the end electrodes being electrically connected together and the middle electrode being insulated therefrom, to produce what is called a unipotential lens. The invention will be hereinafter described in terms of its application to unipotential lenses, although it is applicable to any type of electrostatic electron lens, including electron mirrors, in which two or more electrodes of diaphragm type are to be supported together coaxially.

The invention provides a method of generating apertures in the electrodes and mounting surfaces for the lens as a whole which assures a coaxial relation of the electrode aperture and lens mounting surfaces and a correct figure for these surfaces within very close tolerances. According to the method of the invention the electrode aperture and the lens mounting surfaces are formed by means of boring and turning operations which are performed while the lens elements which are to bear these surfaces are mounted on a lathe. Before the surfaces are formed, the lens elements are demountably assembled together with fastening devices such as screws and dowels which define a unique relation in which the elements after disassembly can be reassembled togethr. The elements are then disassembled, and the first element, typically an end electrode, is fastened to a lathe, thereby defining the axis of rotation for the entire lens as it is thereafter assembled and formed. The lens aperture and mounting surface are then formed on the appropriate lens elements without removing the first axis-defining element from the lathe, the successive lens elements being successively fastened to each other and to this axis-defining element in the proper spatial relation, each one being machined after fastening.

By this method the lens elements are successively assembled and machined without removing the assembly from the lathe until the assembly is completed. After completion of the lens with the elements so assembled together, disassembly is preferably avoided. In the lens of the invention however means are provided whereby disassembly may be made if required, with minimum resulting radial displacement of the elements when reassembled from the relative positions about the lens axis which they occupied during the formation of the aperture and mounting surfaces.

The invention will now be described in terms of its application to a three-electrode electrostatic lens of the unipotential type and by reference to the accompanying drawings in which:

Fig. 1 is an axial section through a lens according to the invention taken along the line 1—1 of Fig. 2, the lens, although shown as a finished lens with completed electrode apertures, being shown mounted in a lathe in accordance with the method of the invention for the successive formation of the electrode aperture and lens mounting surfaces.

Fig. 2 is a sectional view taken along the line 2—2 of Fig. 1.

Fig. 3 is a sectional view taken along the line 3—3 of Fig. 1.

Fig. 4 is an end view in elevation of the lens of Fig. 1 showing the electrode seen at the left in Fig. 1.

Fig. 5 is a fragmentary view at an enlarged scale of one of the end electrodes of the lens of Fig. 1 prior to formation of the aperture therein and illustrating formation of said aperture; and Fig. 6 is a fragmentary view at a different enlarged scale of the middle electrode of the lens of Fig. 1 prior to formation of the aperture therein and illustrating formation of said aperture.

The lens of Figs. 1–4 comprises three apertured diaphragm electrodes 2, 10 and 20 supported in coaxial relation from a generally cylindrical lens barrel or sleeve 26. The particular lens illustrated in the drawings is intended for use as the intermediate lens of an electron microscope, to be positioned between the objective and projection lenses. The electrode 2, intended to face the source of the electrons, i. e. the objective lens, has a long axial throw 3 at the bottom of which is located its electron optically significant diaphragm portion 4, apertured at 5. The central electrode 10 is supported from the barrel 26 by means of an insulator 30 to which it is preferably permanently affixed, the insulator being similarly affixed to the barrel. The insulator may advantageously take the form of the multisection ceramic insulator disclosed and claimed in the copending application of Harold J. Hasbrouck, Serial No. 288,131, filed May 16, 1952, now Patent No. 2,759,117, and assigned to the assignee hereof.

The end electrodes 2 and 20 are each affixed to an end face of the sleeve 26 by means of screws 31 and taper pins or dowels 32 (Figs. 2 and 4). Two or more taper pins are employed between each of the end electrodes 2 and 20 and the sleeve. The holes which accommodate these pins are so positioned with respect to the holes for the screws 31 as to preclude any ambiguity in circumferential positioning of the end electrodes and lens barrel for which assembly can be effected. The pins 32 seat in accurately positioned and fitted tapered holes 35 and 37 in the end electrodes and in the barrel, respectively.

To facilitate disassembly of the lens, when and if required, for example as an aid to cleaning throughout the life of the lens, through holes 39 in the barrel and 41 in each of the end electrodes mate with the taper pin holes 37 so that the taper pins of each end electrode may be driven out from the opposite end of the lens assembly.

The end electrode 2 is further provided with tapped holes for affixation by means of screws 47 to the arms 43 of a fixture 44 fastened to the face plate 45 of a lathe. By giving to the fixture 44 the form of a spider as indicated in Fig. 2, access is obtained to the through holes 41 which communicate with the taper pins which connect the end electrode 20 and the barrel as well as to the screws 31 and taper pins 32 which affix the electrode 2 to the lens barrel.

In the formation of the electrode aperture and lens-mounting surfaces according to the invention, the blank unapertured electrodes are initially assembled successively to the lens barrel by fitting of the mounting screws 31 and taper pins 32, to define a unique relative position of the electrodes to each other and to the lens barrel in which these elements thereafter may be progressively disassembled with a minimum of radial displacement. One of the end electrodes, preferably the electrode 2 whose electron-optically significant diaphragm portion 4 is displaced from the end of the lens barrel, is then affixed to the fixture 44 to rotatably support it in the lathe and is maintained there with the fixture 44 in fixed position relative to the lathe spindle throughout the aperture-forming process. The affixation of the electrode 2 to the fixture 44 defines an axis of rotation not only for the electrode 2 but for the electrodes 10 and 20 and for the lens barrel 26. This is true by virtue of the fact that the middle electrode 10 is permanently fixed with respect to the barrel 26 and that the barrel 26 and electrode 20 can be fastened respectively to the electrode 2 and to the barrel 26 in only one way.

Boring and turning operations successively performed on the elements 2, 10, 20 and 26 then result in the formation of coaxial surfaces on these elements.

According to the preferred practice of the method of the invention as applied to lenses of the type shown in the drawings, the end electrode 2 is secured to the fixture 44 by means of the screws 47. The aperture is then formed in the electrode 2. The unitary middle electrode 10 and the lens barrel 26 are then secured to the first electrode 2 without removing the electrode 2 from the fixture 44 and the aperture in the middle electrode 10 is then formed, together with the mounting rails 50 on the barrel. The third electrode 20 is then secured to the lens barrel 26 and its aperture is formed. By the use of suitable turning tools, as hereinafter described, and by the use of the usual techniques to remove chips and traces of coolant from the interior of the lens, it is then ready for use and no disassembly and reassembly, which might deteriorate the concentricity secured in the turning operations, is necessary.

For the formation of the electrode apertures a rough hole of cylindrical shape, slightly smaller than the minimum diameter of the desired aperture, is first bored by means of a suitable boring tool, properly centered on the lathe axis. The finished aperture surface is then generated by a turning operation or operations. This process is illustrated in Figs. 5 and 6.

In the lens of the drawings, the aperture surfaces are toroidal, i. e. each diaphragm aperture is bounded by the portion of the surface of a toroid lying on the inside of a cylinder coaxial with the toroid and of a radius equal to the separation of the center of the toroidal section from the axis of symmetry. In the case of electrodes of thin section whose toroidal aperture surfaces are of correspondingly small radius of curvature in meridian planes, the aperture surfaces may be generated by a form tool having a profile equal to the section desired to be given to the diaphragm aperture surface in meridian planes. Fig. 5 thus illustrates the formation of the aperture surfaces in the end electrode 2, and the same process may be employed as to electrode 20. A form tool 52 of synthetic sapphire for example having a concave semicircular cutting edge is supported via a steel shank 54 from a tool post mounted on a compound slide of the lathe permitting controlled parallel motions of the tool along and transversely of the lathe axis. The semicircular cutting edge of the tool 52 has a diameter substantially equal to the thickness of the diaphagm 4 of electrode 2.

By suitable accurate adjustments of the slide on which the tool 52 is supported, it may be positioned with its cutting edge in a plane passing through the lathe axis, with the limb of its semicircular cutting edge on the lathe axis, with the diameter which limits its cutting edge parallel to the lathe axis, and at a position axially of the lathe which places the tangents to the ends of its cutting edge in the planes which bound the faces of the electrode diaphragm 4 to be apertured. By moving the tool radially without rotation and without motion lengthwise of the lathe axis a distance equal to the desired minimum radius of the diaphragm aperture, the desired toroidal surface will be generated as indicated at the dotted line 55 in Fig. 5. Aluminum has proved to be a suitable metal on which surfaces of perfect finish can be generated directly by the turning operation just described, without any subsequent polishing operations which might impair the symmetry of the surfaces, and the diaphragm electrodes are preferably made of this metal. A low cutting speed and a light cut should be employed, with a plentiful flow of coolant.

In the case of electrodes of thicker section such as the middle electrode 10, i. e. electrodes whose aperture surfaces conform to toroids of larger radius, tools of the type shown in Fig. 5 have a tendency to vibrate or chatter, and it is desirable to finish the aperture with a tool which engages only part of the profile of the lens aperture at once. A tool of this type is shown at 58 in Fig. 6. It consists of a blade of sapphire having an arcuate cutting edge of some 50° on a circle of radius $r_1$ slightly greater than the radius $r_2$ of the section of the desired toroidal surface to be formed. The tool 58 is supported in a steel shank from a compound slide permitting accurately controlled orthogonal parallel motions and circular motion as well, in planes containing the lathe axis. The same slide may of course be used for support of the tool 52 of Fig. 4 as well.

The electrode 10 of Fig. 6 may be brought by means of boring and turning operations similar to those described in connection with Fig. 5 to have a toroidal aperture surface as indicated at 60, having a slightly smaller minimum radius $r_3$ than the desired minimum radius $r_4$ of the aperture to be formed. The slide supporting the generating tool 58 is then adjusted to rotate the tool 58 about a center distant from the mid-point of its cutting edge by the distance $r_2$, and, by suitable accurate adjustments of the center of rotation for the tool 58 so established, is positioned relative to the lathe in the plane perpendicular to the lathe axis which bisects the thickness of the diaphragm. The cross slide is then carefully and slowly moved transverse to the lathe axis as the tool 58 is swung about its center of rotation until the center of rotation reaches the position of the center of the section in meridian planes of the lathe of the desired toroidal surface.

The positioning and the control of motion of the tools employed for generation of the electrode apertures is preferably accomplished by optical means in order to obviate the necessity of applying any form of gauge to the finished aperture surfaces.

By the method of the invention it is possible to produce lenses whose apertures are coaxial to a very high degree of accuracy and whose coaxial relationship is preserved with a minimum of radial displacement when disassembly and reassembly are required in the use of the lens.

I claim:

1. The method of making an electrostatic electron lens including a plurality of apertured diaphragm electrodes supported together in an ordered coaxial array which comprises rotatably supporting one of the end electrodes of said array in a lathe and forming an aperture therein, fixedly supporting with respect to said end electrode while so supported the electrode next thereto in said array and forming an aperture therein, and successively fixedly supporting with respect to the electrodes already so supported and forming apertures in the remaining electrodes of said array in the order which they occupy in said array without removal of any of said electrodes from said lathe until apertures have been formed in all of said electrodes.

2. In the manufacture of an electrostatic electron lens including front, middle and rear apertured diaphragm electrodes and a lens barrel to which said electrodes are fastened, the method of generating coaxial apertures in said electrodes which comprises supporting one of said front and rear electrodes on a rotating spindle and turning an aperture therein, affixing to said one electrode the lens barrel with the middle electrode fastened thereto and turning an aperture in said middle electrode, and fastening to said lens barrel the other of said front and rear electrodes and turning an aperture therein, all without disassembling any of said electrodes from said lens barrel and without removing said one of said front and rear electrodes from said spindle until apertures are formed in all of said electrodes.

3. In the manufacture of an electrostatic electron lens including front, middle and rear electrodes and a lens barrel, the method of generating apertures in said electrodes and mounting surfaces on said barrel, which apertures and mounting surfaces will be all coaxial, which method comprises demountably assembling said electrodes and barrel into a rigid structure by fastening means which establish a unique relative positional arrangement in which said electrodes and barrel may after disassembly be assembled into a unitary structure, at least partially disassembling said electrodes and barrel from each other, supporting one of said front and rear electrodes on a rotating spindle and turning an aperture therein, affixing to said one electrode the lens barrel with the middle electrode fastened thereto and turning an aperture in said middle electrode and mounting surfaces on said lens barrel, and fastening to said lens barrel the other of said front and rear electrodes and turning an aperture therein, all without disassembling any of said electrodes from said lens barrel after affixation thereto and without removing said one of said front and rear electrodes from said spindle until apertures are formed in all of said electrodes and until mounting surfaces are formed on said lens barrel.

References Cited in the file of this patent

UNITED STATES PATENTS

| | | |
|---|---|---|
| 1,064,988 | Osgood | June 17, 1913 |
| 2,292,877 | Hillier | Aug. 11, 1942 |
| 2,357,610 | Ryffe | Sept. 5, 1944 |